United States Patent
Iraschko

(10) Patent No.: US 7,987,953 B2
(45) Date of Patent: Aug. 2, 2011

(54) COMPACT COMBINED BRAKE CYLINDER

(75) Inventor: Johann Iraschko, Schweitenkirchen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/567,085

(22) Filed: Sep. 25, 2009

(65) Prior Publication Data

US 2010/0051396 A1    Mar. 4, 2010

Related U.S. Application Data

(63) Continuation of application No. PCT/EP2008/002129, filed on Mar. 18, 2008.

(30) Foreign Application Priority Data

Mar. 27, 2007  (DE) .......................... 10 2007 015 213

(51) Int. Cl.
*F16D 65/24* (2006.01)
(52) U.S. Cl. ............... 188/170; 92/63; 303/89
(58) Field of Classification Search .................. 188/170, 188/166; 303/89; 92/63, 130 A, 130 R, 134
See application file for complete search history.

(56) References Cited

U.S. PATENT DOCUMENTS

| | | | | |
|---|---|---|---|---|
| 3,188,922 A | * | 6/1965 | Cruse | 92/52 |
| 3,636,822 A | | 1/1972 | Horowitz | |
| 3,710,692 A | * | 1/1973 | Valentine | 92/63 |
| 3,717,072 A | * | 2/1973 | Kaltenthaler et al. | 92/152 |
| 5,125,326 A | * | 6/1992 | Sarcona | 92/62 |
| 5,377,579 A | * | 1/1995 | Pierce | 92/63 |
| 7,523,999 B2 | | 4/2009 | Iraschko | |

FOREIGN PATENT DOCUMENTS

| | | |
|---|---|---|
| DE | 199 33 165 A1 | 1/2001 |
| DE | 10 2005 044 708 A1 | 4/2006 |
| WO | WO-96/26854 A1 * | 9/1996 |

OTHER PUBLICATIONS

German Office Action dated Jan. 11, 2008 including English translation (six pages).
International Search Report dated Aug. 21, 2008 including English translation (four pages).

* cited by examiner

*Primary Examiner* — Pam Rodriguez
(74) *Attorney, Agent, or Firm* — Crowell & Moring LLP

(57) ABSTRACT

A brake cylinder for pneumatically actuated vehicle brakes includes a parking brake spring-loaded brake section and a service brake section combined to form a structural unit in a housing. The housing is divided into two chambers by a piston. A cylinder spring of the spring-loaded brake section acts on another spring-loaded piston in the chamber, which can be blocked in relation to the first piston by a pneumatically actuated locking mechanism, and can be released from the first piston by the releasing action of the blocking mechanism. Following the release, the cylinder spring acts between the two pistons and moves the two pistons in relation to each other during a parking brake process. The pneumatically actuatable blocking mechanism acts only in an expansion direction of the spring.

17 Claims, 5 Drawing Sheets

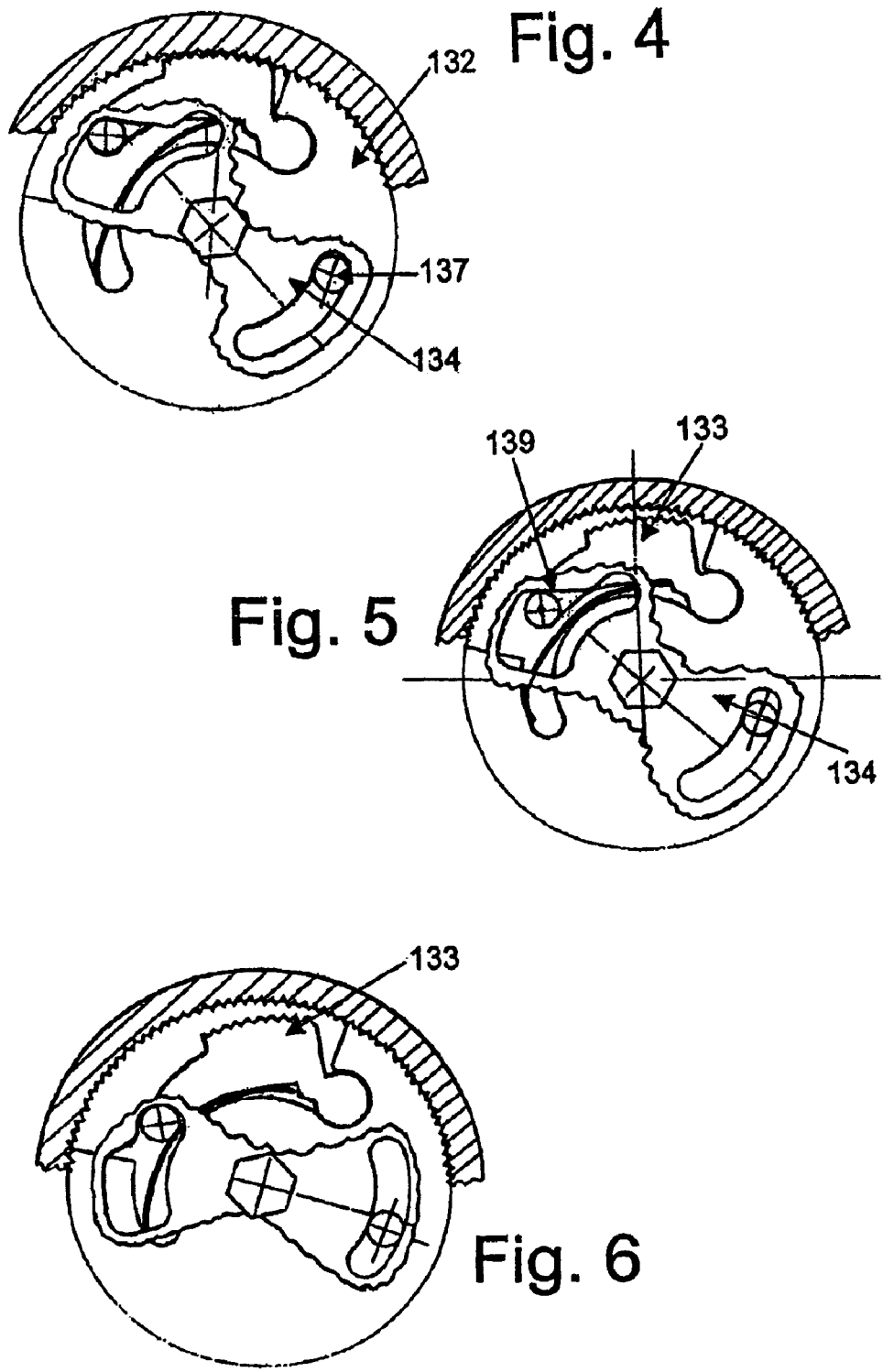

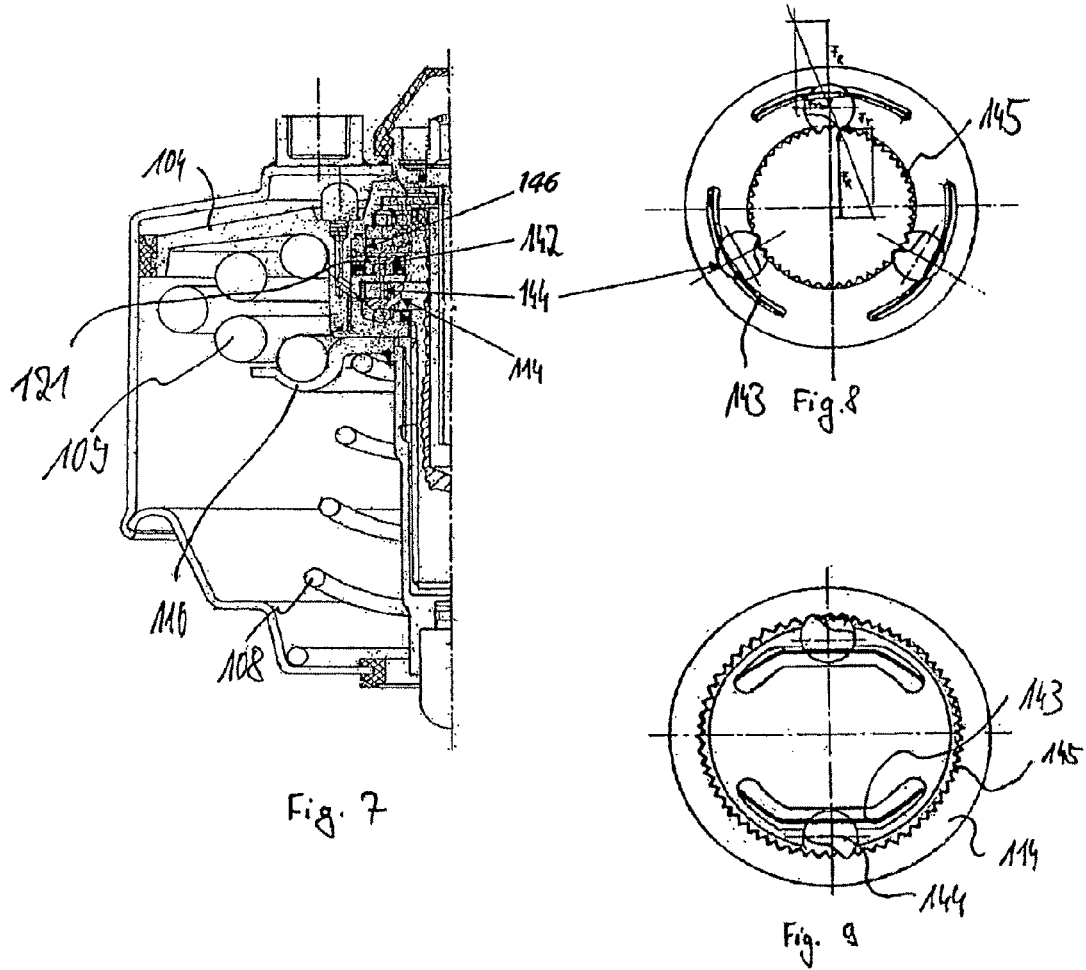

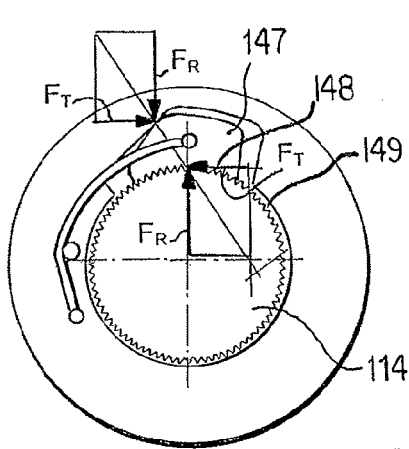
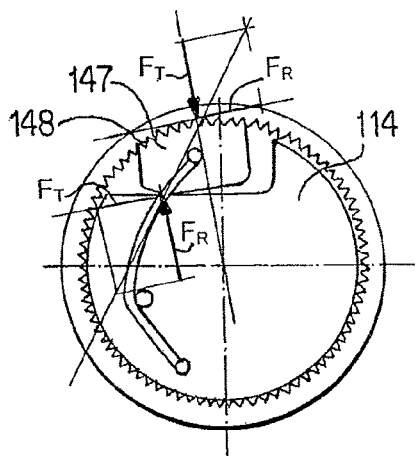
Fig. 10
Fig. 11
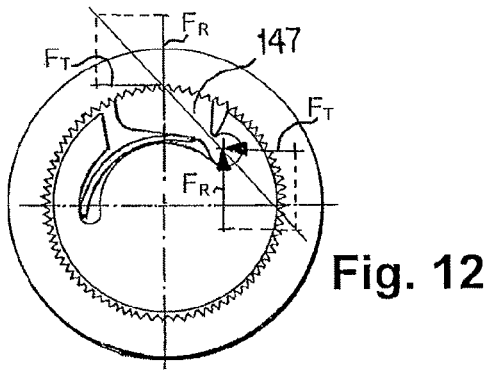
Fig. 12
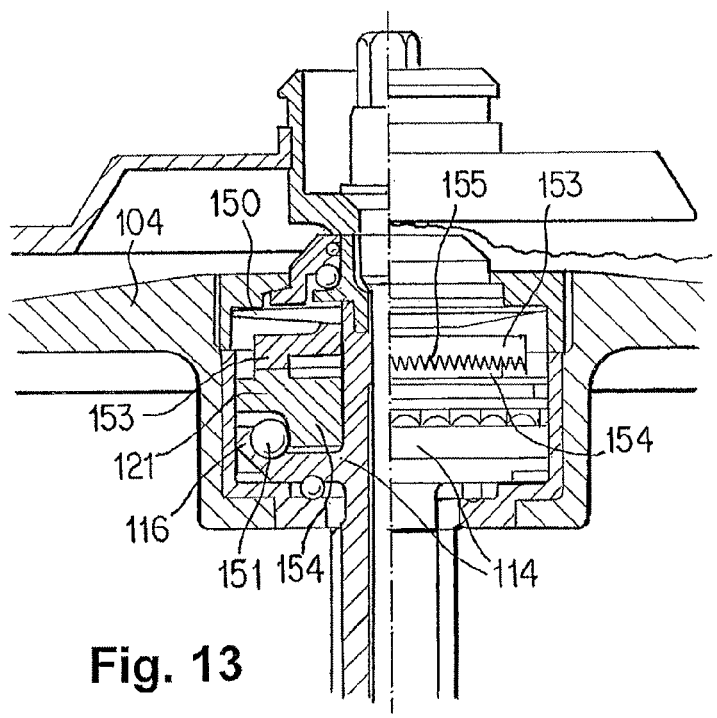
Fig. 13

COMPACT COMBINED BRAKE CYLINDER

CROSS-REFERENCE TO RELATED APPLICATIONS

This application is a continuation of PCT International Application No. PCT/EP2008/002129, filed Mar. 18, 2008, which claims priority under 35 U.S.C. §119 to German Patent Application No. 10 2007 015 213.4, filed Mar. 27, 2007, the entire disclosures of which are herein expressly incorporated by reference.

This application contains subject matter related to U.S. application Ser. No. 12/567,080, entitled "Compact Combined Cylinder Comprising a Manual Release Device;" U.S. application Ser. No. 12/567,098, entitled "Compact Combination Cylinder for Vehicle Brakes, Comprising a Control Device, and Method for Controlling the Brake Cylinder;" U.S. application Ser. No. 12/566,980, entitled "Compact Combined Cylinder Comprising a Manual Release Device;" U.S. application Ser. No. 12/566,991, entitled "Brake Cylinder for a Pneumatically Operable Vehicle Brake" and U.S. application Ser. No. 12/567,043, entitled "Compact Combination Brake Cylinder Comprising a Pneumatic Locking Mechanism," all filed on even date herewith.

BACKGROUND AND SUMMARY OF THE INVENTION

The invention relates to a brake cylinder for pneumatically actuated vehicle brakes, in particular for commercial vehicles.

In heavy commercial vehicles, the parking brake is actuated by means of what are known as spring force accumulator cylinders (spring-loaded cylinders). Here, the brake actuating force is generated via spring force, with the result that the requirements for a mechanically actuated parking brake are satisfied.

Since the spring force accumulator cylinders are, as a rule, designed to generate very high forces, manual release in the operating case is no longer appropriate. In the case of pneumatically actuated brakes, the parking brake is therefore released by means of compressed air.

In order to make this possible, spring force accumulator cylinders are, as a rule, equipped with a release piston. It is possible by way of this piston, if compressed air is introduced, to compress the spring to such an extent that the brake is released. In order that the parking brake is not engaged while driving, the piston is loaded constantly with compressed air, with the result that the spring cannot be relieved and therefore the parking brake does not start to act.

The most common design is what is known as a combined cylinder. A combined cylinder includes or combines two different brake cylinder types, namely a spring force accumulator cylinder for the parking brake system (PBS) and a compressed air cylinder (usually a diaphragm cylinder) for the service brake system (SBS).

The two cylinders are usually arranged behind one another in an axial direction. The spring force accumulator part which acts with its piston rod on the piston collar of the diaphragm cylinder and by the latter, in turn, on the brake lever, is arranged behind the diaphragm part of the combined cylinder.

This design requires a relatively large amount of installation space. However, the installation space is being limited increasingly by the introduction of more complex chassis systems, such as independent suspension systems, lightweight axles, etc.

There are therefore efforts to minimize the space requirement for the parking brake cylinder by other designs and methods of operation. To this extent, what is known as the compact combined brake cylinder affords a more compact design. DE 10 2005 044 708 A1 (corresponding to U.S. Pat. No. 7,523,999 B2) discloses a brake cylinder of this type, in which the function of the parking brake cylinder is integrated directly into the service brake cylinder. Here, the spring force accumulator spring is no longer actuated via a separate spring force accumulator piston, but rather likewise via the piston of the service brake cylinder.

In order to release the parking brake, the SBS piston is loaded for a short time period by way of a special actuation with compressed air. Since the piston force which is produced here is greater than the maximum compressive force of the accumulator spring, the accumulator spring is compressed. A pneumatically actuated locking mechanism is required to arrest the spring.

This pneumatically actuated mechanism can be implemented in different ways. One option arrests the spring force accumulator spring via a threaded spindle, which is not self-locking. To this end, it is necessary to arrest the threaded spindle by the pneumatically switchable locking mechanism.

The invention has the object of providing the brake cylinder of the generic type with a reliably operating, pneumatically actuable locking mechanism having a compact design.

The invention achieves this object by providing a brake cylinder for pneumatically actuated vehicle brakes, in particular for commercial vehicles, having a spring force accumulator brake section for carrying out parking brake operations by way of a spring force accumulator spring, and a service brake section for carrying out service brake operations, which are actuated by compressed air. The spring force accumulator brake section and the service brake section are combined in a housing to form one structural unit. The housing is divided by a piston into two spaces, of which one of the two spaces serves as pressure space for actuating the service brake section. The spring force accumulator spring of the spring force accumulator section is arranged in the further space on the opposite side of the piston. The spring force accumulator spring acts in the space on a further spring force accumulator piston, which can be locked with respect to the piston, by way of a pneumatically actuable locking mechanism and can be released from the locking mechanism by release of the latter, and which is connected directly or via further elements to a piston rod for actuating the vehicle brake. After the release of the locking mechanism, the spring force accumulator spring acts between the two pistons and displaces them relative to one another in the case of a parking brake operation. The pneumatically actuable locking mechanism is designed in such a way that it acts only in the expansion direction of the spring.

Advantageous refinements of the invention are described herein.

The invention uses the following effect. During compression of the accumulator spring by the cylinder piston, it is necessary for the threaded spindle to be able to rotate. The threaded spindle therefore must not be blocked by the locking mechanism in this phase.

To this end, a defined functional sequence is necessary during the release of the spring force accumulator brake. The cylinder is controlled here such that the locking mechanism is not loaded with compressed air during the compression of the accumulator spring. The locking mechanism is not activated until the accumulator spring is compressed to the defined dimensions.

However, this functional sequence cannot be guaranteed by way of an external controller in all operating conditions. It is therefore possible according to the invention to compress the accumulator spring by the cylinder piston even when the locking mechanism is activated.

Since the force of the spring always acts in the same direction independently of the movement direction, it is sufficient if the locking mechanism is active only in the expansion direction of the spring.

As a result of the integration of a directionally dependent clutch, the threaded spindle can be rotated only in one direction when the locking mechanism is activated. Here, the freewheel or the ratchet coupling has to be oriented in such a way that the locking action acts in the expansion direction of the accumulator spring.

Reliable arresting of the spring force accumulator spring is important for the function of the compact combined cylinder. In particular, no impairment of the spindle locking should occur as a result of shaking loads and vibrations. A directional clutch, which is based on a positive locking action, therefore appears to be a preferable system for this application.

According to one particularly advantageous variant, the invention is realized in a manner providing a compact and simple design by using a ratchet mechanism integrated into the locking mechanism piston.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 3 to 6 are partly cut-away illustrations of elements of a manually actuable release device of the compact brake cylinder from FIGS. 1 and 2 in different operating states;

FIG. 7 shows a brake cylinder according to the invention in half section, on the left-hand side in the release position;

FIG. 8 shows a detailed view of components of the brake cylinder from FIG. 7 in different functional states; and FIGS. 9-13 show different views of assemblies or sections of further brake cylinders according to the invention.

DETAILED DESCRIPTION OF THE DRAWINGS

Figure 1:
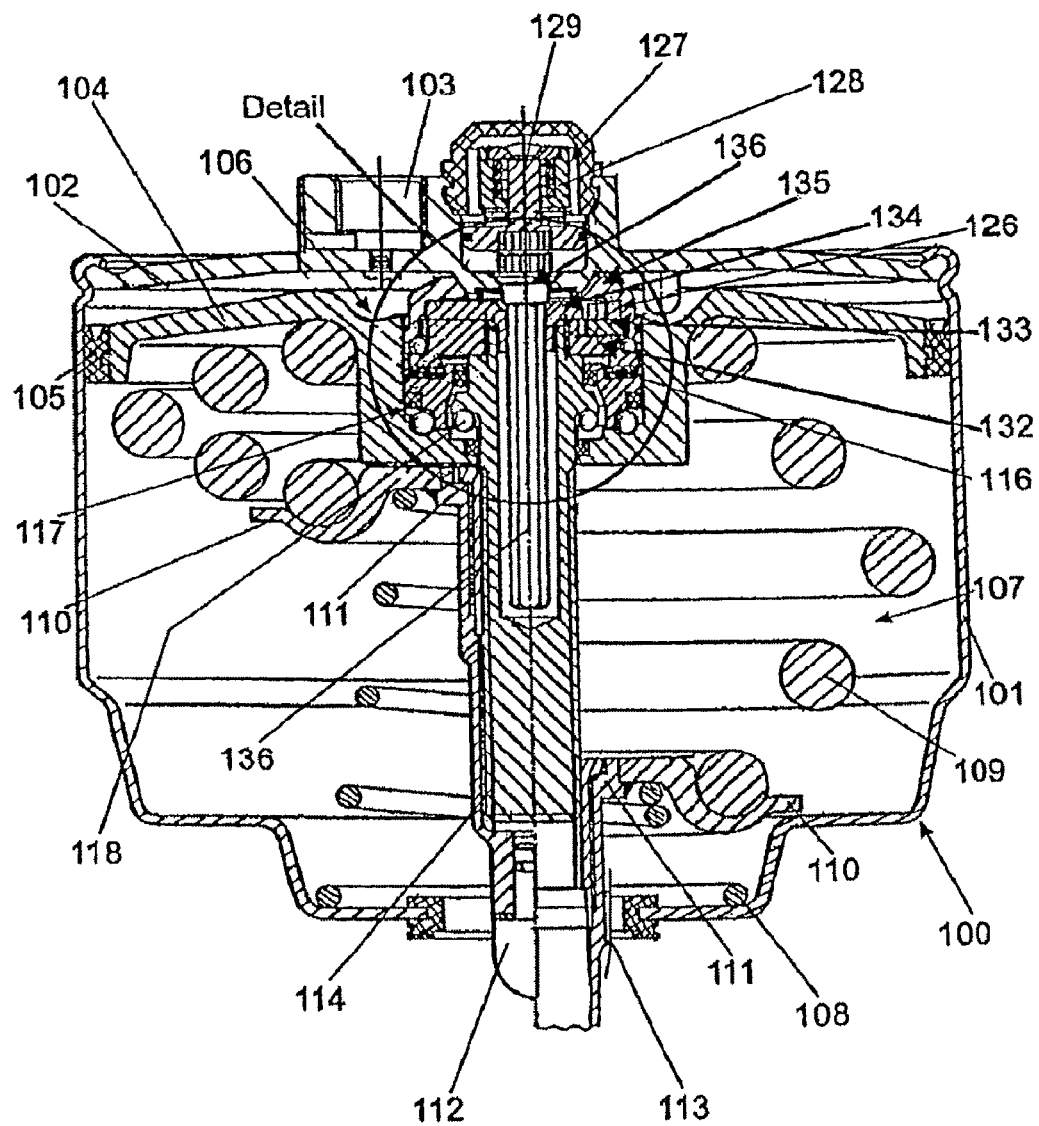
FIG. 1 is a cross-sectional view of a brake cylinder, on the left in the release position and on the right in the parking brake position, as an exemplary illustration of the function of a compact combined brake cylinder.

FIG. 1 shows a section through a compact brake cylinder 100 according to an embodiment of the invention, the spring force accumulator being shown in the released position in the left half of the drawing and the spring force accumulator being shown in the engaged position in the right half of the drawing.

Figure 2:
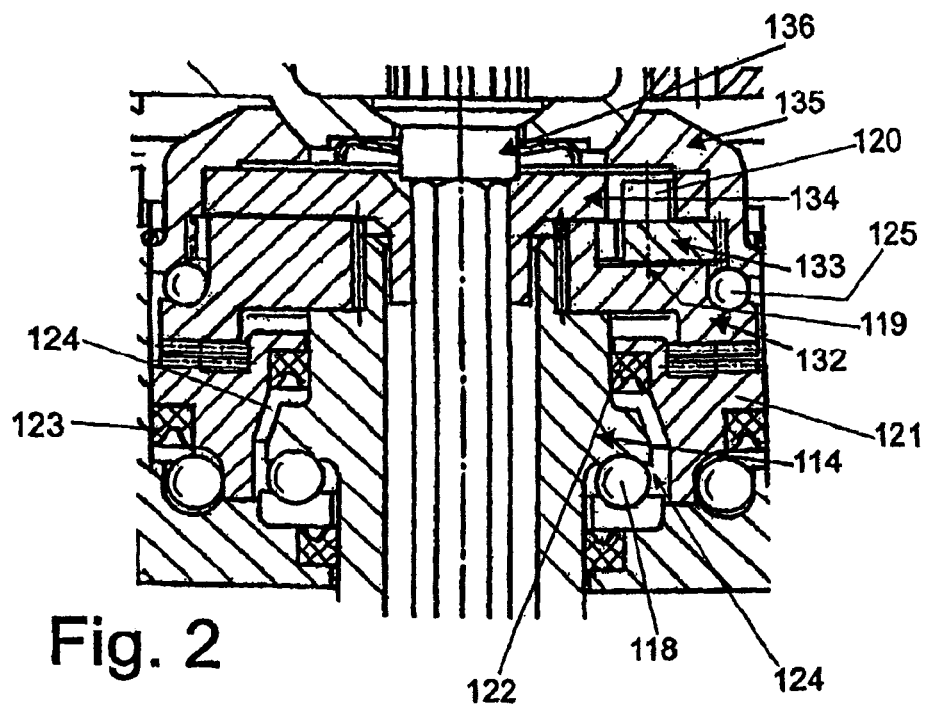
FIG. 2 shows a detailed view from FIG. 1.
Figure 3:
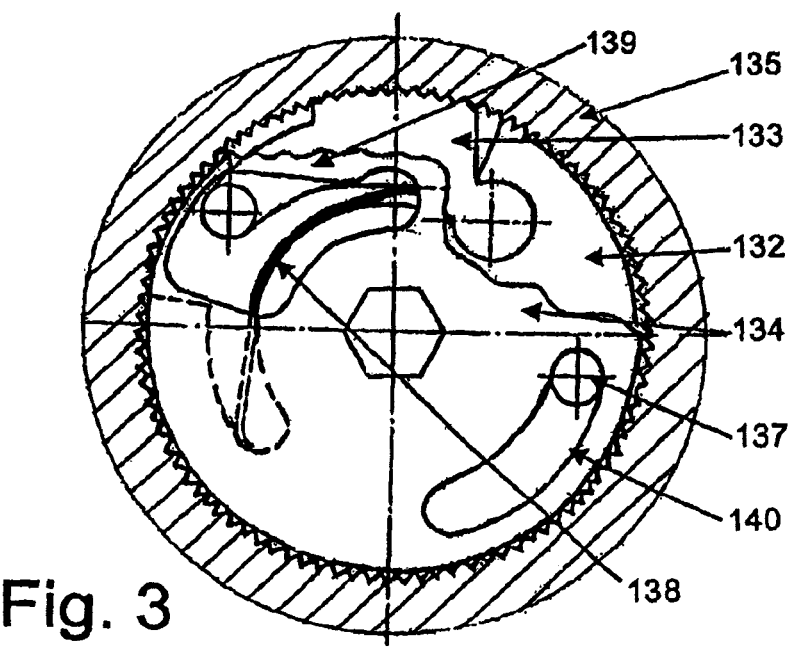

The brake cylinder 100, which is shown in FIGS. 1 to 3, has a housing 101 which is cup-shaped and preferably substantially cylindrical. The housing 101 is closed at one of its ends by a cover 102, which is provided with at least one or more compressed air connections 103. A piston 104 having a piston sealing ring 105 is arranged in the cup-shaped housing 101, the diameter of the piston 104 together with the piston sealing ring 105 corresponding to the internal diameter of the housing 101. The piston 104 can be loaded through the compressed air connection 103 with compressed air, which can also flow out through said connection.

As FIG. 1 shows, the piston 104 is countersunk in its central region, with the result that a pressure space 106 is produced. A further space 107 is delimited by the piston 104, into which further space 107 a conical return spring 108 and a spring force accumulator spring 109 are inserted. The spring force accumulator spring 109 is placed between the piston 104 and a spring force accumulator piston 110, the diameter of which is smaller than the internal diameter of the housing. The return spring 108 is placed between the side of the spring force accumulator piston 110 which faces away from the spring force accumulator and the inner end region of the housing 101 which faces away from the cover.

On its internal circumference, the spring force accumulator piston 110 rests on a collar 111 of a piston rod 112. The piston rod 112 penetrates an opening 113, which is formed in the housing 101 on the end of the housing 101 facing away from the cover 102. The piston rod 112 serves to actuate an application apparatus of a brake.

A pneumatically actuable locking mechanism 116 is accommodated in a central receiving space 117 of the piston 104 on the side of the piston 104 which faces the cover 102. The piston 104 receives the locking mechanism.

The piston rod 112 is of sleeve-shaped design and is provided with an internal thread, into which a threaded spindle 114 (provided with an external thread) engages. The threaded spindle 114 is not of a self-locking design. It is preferably coupled at one of its ends directly or via intermediate elements to the pneumatically actuable locking mechanism 116, which is configured here in the form of a pneumatically actuable clutch or brake. In the exemplary embodiment which is shown, the locking mechanism is configured as a positively engaging clutch 116.

Here, the clutch 116 is formed in an advantageous and compact way between a locking mechanism piston 121 and the axial faces of a bearing plate 132 (explained below) and is coupled to the threaded spindle in a rotationally fixed manner.

On its internal and its external circumference, the locking mechanism piston 121 is sealed by way of piston ring seals 122, 123 with respect to the threaded spindle 114 and the receiving space 117.

The locking mechanism piston 121 can be loaded with compressed air via a pressure space 124 and via a compressed air line (in a manner which is not shown here), as a result of which the clutch 116 can be brought into engagement. The threaded spindle 114 is correspondingly prevented from rotating by loading the pressure space 124 below the locking mechanism piston 121 with compressed air, with the result that the PBS brake can be set out of operation. The threaded spindle 114 is supported on the piston 104 via rolling bodies 118.

In the position on the left of FIG. 1, the clutch 116 is closed and the pneumatically actuable locking apparatus is activated, with the result that the threaded spindle 114 is secured against rotating.

If the spring force accumulator piston 110 is then to be transferred into the parking brake position, which is shown in the illustration on the right of FIG. 1, the force which is guided into the clutch 116 from the locking mechanism piston 121 is reduced by a pressure drop in the space 124, with the result that the force which is applied by the spring force accumulator spring 109 brings about a situation where the threaded spindle 114 rotates, the spring force accumulator piston 110 being displaced with the piston rod 112 in the braking position.

The rotational speed can be regulated by the brake force of the clutch 116, with the result that the linear movement of the spring force accumulator piston 110 can also be controlled.

In order to release the braking position, the pressure space 106 is loaded with pressure in accordance with the preceding embodiment. Since the parking brake piston 121 is now pressureless, the threaded spindle 114 can be rotated and the spring force accumulator piston 110 is moved back into the initial position counter to the action of the spring force accumulator spring 109.

In the case of service brake operations, the clutch 116 remains in the braking position, with the result that the two pistons 104, 110 are moved jointly into the braking position, without changing their relative position with respect to one another. The action of the spring force accumulator spring 109 cannot be developed in this state. An analogous situation is valid for the release of the brake after service brake operations.

In the case of the compact combined cylinder 100, the function of the parking brake cylinder is integrated into the service brake cylinder. Here, the spring force accumulator spring 109 is no longer actuated via a separate spring force accumulator piston, but rather via the piston 104 of the service brake cylinder. In order to release the parking brake, the SBS piston is loaded for a short time period by means of a special actuation with compressed air.

As described in the preceding text, the parking brake or the parking brake section is released as a rule with the aid of compressed air. In addition, however, it is also possible according to the invention to release the parking brake section manually by way of a manually actuable release device in the case of a pressure loss. To this end, in the case of conventional combined cylinders, the spring is pulled back with the aid of a threaded spindle (of what is known as the release spindle). The function of the service brake cylinder is not impaired as a result.

In the case of the compact combined cylinder, this cannot be realized in such a simple way, since the SBS piston and the spring force accumulator spring are connected to one another. If the spring force accumulator spring 109 were pulled back by a threaded spindle which is accessible from the outside, the SBS piston would also be blocked and, as a consequence, there would also no longer be the function of the SBS cylinder.

A manually actuable release device is therefore advantageous for manually releasing the spring force accumulator spring, which manually actuable release device makes it possible to cancel the spring force accumulator action in the case of pressure loss, without impairing the SBS function. Furthermore, it is to be possible to reestablish the PBS action after the release operation by a manual operation. This is achieved by the fact that the manually actuable release device is assigned a likewise manually actuable locking apparatus. The locking apparatus which is shown in the drawings and will be described in greater detail is based on a ratchet mechanism.

The ratchet mechanism has a bearing plate 132, which is coupled in a rotationally fixed manner to the threaded spindle 114 or is integrally configured with the latter. The threaded spindle 114 is supported on a cup disk 135 by way of rolling bodies 125 and can be rotated relative to the locking apparatus depending on the functional position of the latter which acts between these two elements 132, 135. The bearing plate 132 has a recess 119 for a locking pawl 133 and a peg 137, which serves for torque transmission. The locking pawl 133 is inserted rotatably into the bearing plate 132, is connected to the disk cam 134 by an integrally formed pin 120 and is pressed radially to the outside by a leaf spring 138.

Furthermore, the ratchet mechanism includes a disk cam 134 with a control contour 139, an arcuate slot 140 and a centrally arranged hexagonal aperture. The control contour 139 serves for switching the locking pawl 133 on and off. In contrast, the arcuate slot 140 serves, above a defined angular travel, to transmit the torque to the bearing plate 132. The hexagon socket serves to introduce the torque into the disk cam 134. A profiled actuating mandrel 136 serves to introduce the manually applied torque. Furthermore, it serves to switch the mechanism on and off. The actuating mandrel 136 is mounted rotatably and pivotably in the housing 101 of the brake cylinder.

Furthermore, the ratchet mechanism includes the cup disk 135 having an internal toothing system, which is in engagement with the locking pawl 133 having a corresponding toothing system in the case of the manual release operation. The cup disk 135 is supported on the piston 104 and cannot be rotated relative to the latter. Since it is a positively engaging ratchet mechanism, reliable and slip-free locking of the spring force accumulator spring is ensured.

The function of this arrangement is as follows. In the case of the manual release of the spring force accumulator spring 109, the threaded spindle 114 has to be turned back with the aid of a wrench. Here, the torque is transmitted via the actuating mandrel 136 into the disk cam 134. As a result of the rotation of the disk cam 134 relative to the bearing plate 132, the locking pawl 133 is released by the control contour 139 for engagement into the toothing system of the cup disk 135. Here, the locking pawl 133 is pressed elastically by the leaf spring 138 against the internal toothing system of the rotationally fixed cup disk 135. At the same time, after rotating past the control angle, the torque is transmitted via the arcuate slot 140 and a corresponding peg 137 in the bearing plate 132, from the disk cam 134 into the bearing plate 132 and from there into the threaded spindle 114.

Since, on account of the direction-dependent locking action, the locking pawl 133 prevents automatic turning back of the threaded spindle 114, the wrench can be turned without the threaded spindle 114 being turned back. This operation can be repeated until the spring force accumulator spring has reached the release position for the parking brake.

If the spring force accumulator spring is to be moved from the position "spring force accumulator released" manually into the position "spring force accumulator engaged", a rotational movement in the locking direction of the ratchet mechanism has to be carried out by way of the wrench. Here, first of all, the disk cam 134 is rotated relative to the bearing plate 132 until the locking pawl 133 is pulled out of the internal toothing system of the cup disk 135 by the control contour 139. As soon as this state is reached, the threaded spindle 114 can be rotated.

FIG. 5 shows a manual application of this type of the spring force accumulator brake. In this figure, the disk cam 134 is rotated to the left, as a result of which the locking pawl 133 is pulled out of the toothing system via the contour 139. As a result, the bearing plate 132 can be rotated as far as the next latching of the locking pawl 133.

Since the threaded spindle 114 moves more quickly than the disk cam 134 which is guided by the wrench, a relative movement occurs between the bearing plate 132 and the disk cam 134 and, as a consequence, the locking pawl 133 latches again in the internal toothing system of the rotationally fixed cup disk 135. This ensures that the threaded spindle 114 is rotated only so far and as quickly as is predefined by the rotational movement of the wrench.

To this end, it is necessary to rotate the actuating mandrel 136 with the aid of a wrench in the direction of "engage spring force accumulator brake" until a further rotation is no longer possible. This achieves a situation where the disk cam 134 is rotated relative to the bearing plate 132 and the switching pin of the locking pawl 133 is moved into a latching position on the control contour 139.

FIG. 6 shows the manual release device in its deactivated position. The locking pawl 133 remains in its rest position.

FIG. 4 shows the locking position of the free wheel. The bearing plate 132 is rotated to the right by the disk cam 134 via the pin 137. The bearing plate 132 cannot rotate automatically to the left in this position.

As described in the preceding text, during the manual release operation of the spring force accumulator brake, the threaded spindle 114 is rotated with the aid of what is known as the actuating mandrel 136 and the ratchet mechanism 126 for pulling back the accumulator spring 109 by way of a wrench.

During the manual release operation, the actuating mandrel 136 is in contact with the manual rotating apparatus 127 for attaching an actuating tool, in particular a wrench. The rotating apparatus 127 is designed in such a way that, for example while being turned back, that is to say, releasing of the spring force accumulator, an outer sleeve 128 follows a travel (stroke) in the axial direction as a result of a special shape, until an introduction of torque is possible.

This axial stroke results in a graduation on the end side between the outer sleeve 128 and an inner pin 129. On account of this clear contour change, the manual release state of the spring force accumulator brake can be visually detected or sensed.

The preceding figures served to illustrate the functional principle of a novel compact brake cylinder which is provided in the following figures with pneumatically actuable locking mechanisms designed according to the invention.

FIGS. 7 to 12 show different embodiments for use in the compact combined cylinder.

FIG. 7 shows a half section through an embodiment of the compact combined cylinder having an integrated ratchet mechanism 142 in the locking mechanism piston 121. The locking mechanism piston 121 is arranged displaceably in the surrounding piston 104 but in a manner wherein it cannot be rotated relative to the piston 104 in the circumferential direction.

As can be seen in FIG. 8, three locking elements 144, which are spring-loaded radially inward here by a spring 143 and have a toothing system, are inserted into the piston. The locking elements 144 engage here into a corresponding toothing system 145 on the external circumference of the threaded spindle 114.

Since the locking mechanism piston 121 is pressed into a piston-side toothing system 146 of the piston 104 (in the receiving space 117), a rotation of the locking mechanism piston 121 is not possible in the case of being loaded with compressed air. The threaded spindle 114 can therefore be rotated only in the release direction of the ratchet mechanism. Secure fixing of the accumulator spring is therefore ensured.

FIGS. 9 to 12 show further embodiments.

While FIG. 7 shows a ratchet mechanism with an external toothing system and radially inwardly acting locking elements 144, FIG. 9 shows a reverse system, that is to say the spring 143 presses the locking elements here radially to the outside into a toothing system on the internal circumference of an annular section of the threaded spindle 114 or the locking mechanism piston 121.

In this embodiment, the forces which act on the locking elements 144 are lower since the effective diameter is greater in comparison. The locking elements 144 can therefore be reduced in number or have smaller dimensions. In both embodiments, leaf springs 143 preferably serve to press the locking elements 144.

FIG. 10 shows a ratchet mechanism with an eccentrically acting force. A locking pawl 147 engages by way of a plurality of teeth 148 into a corresponding profile 149 of the threaded spindle 114. The force on the individual tooth is reduced as a result and a higher loadbearing capability is therefore achieved.

The locking pawl 147 is pressed into the toothing profile 149 by the obliquely running supporting surface. There is therefore a reliable locking action. The locking pawl 147 is prestressed by way of a shaped spring 148; a rapid and reliable response is therefore ensured. FIG. 11 shows the reverse system. The loading on the locking pawl 147 is lower on account of the greater effective diameter.

FIG. 12 shows a system with a pivotable locking pawl 147. In the locking direction, the locking pawl 147 is pressed by the circumferential force into the corresponding toothing system 149 of the threaded spindle 114. It is important here that the spacing of the pivot point from the force introduction line is as great as possible in the radial direction, in order to achieve a reliable clamping action.

FIG. 13 shows a clutch system which acts in the axial direction. In this example, the piston 121 is prestressed by way of a disk spring 150. At the same time, the transmission of the torque from the piston 121 to the piston 104 is also carried out by way of the disk spring 150. A cone clutch 151 with balls is used as clutch 116.

The locking mechanism piston is of a split configuration and has two sections 153 and 154, which engage axially into one another via a directional sawtooth system 155 with considerably steeper flanks in a circumferential direction. The directive efficiency is achieved by the sawtooth shape of the toothing system 155 between the sections 153 and 154 of the locking mechanism piston 121. In this embodiment, all the teeth are in engagement at the same time; the loading for the toothing system is therefore relatively low.

| Table of Reference Numerals | |
|---|---|
| Compact brake cylinder | 100 |
| Housing | 101 |
| Cover | 102 |
| Compressed air connections | 103 |
| Piston | 104 |
| Circumferential sealing ring | 105 |
| Pressure space | 106 |
| Space | 107 |
| Return spring | 108 |
| Spring force accumulator spring | 109 |
| Spring force accumulator piston | 110 |
| Collar | 111 |
| Piston rod | 112 |
| Opening | 113 |
| Threaded spindle | 114 |
| Locking mechanism | 116 |
| Receiving space | 117 |
| Rolling bodies | 118 |
| Recess | 119 |
| Pin | 120 |
| Locking mechanism piston | 121 |
| Piston seals | 122, 123 |
| Pressure space | 124 |
| Rolling body | 125 |
| Ratchet mechanism | 126 |
| Rotating apparatus | 127 |
| Sleeve | 128 |
| Pin | 129 |
| Bearing plate | 132 |

-continued

Table of Reference Numerals

| | |
|---|---|
| Locking pawl | 133 |
| Disk cam | 134 |
| Cup disk | 135 |
| Actuating mandrel | 136 |
| Peg | 137 |
| Leaf spring | 138 |
| Control contour | 139 |
| Slot | 140 |
| Ratchet mechanism | 142 |
| Spring | 143 |
| Locking elements | 144 |
| Toothing | 145 |
| Toothing | 146 |
| Locking pawl | 147 |
| Teeth | 148 |
| Corresponding profile | 149 |
| Shaped spring | 141 |
| Disk spring | 150 |
| Cone clutch | 151 |
| Balls | 152 |
| Sections | 153 and 154 |
| Saw toothing system | 155 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake cylinder for a pneumatically actuated vehicle brake, comprising:
    a spring force accumulator brake section for carrying out parking brake operations via a spring force accumulator spring, and a service brake section for carrying out service brake operations which are actuated by compressed air, the spring force accumulator brake section and the service brake section being combined in a housing to form one structural unit;
    a first piston dividing the housing into two spaces, of which one of the two spaces serves as a pressure space for actuating the service brake section, the spring force accumulator spring of the spring force accumulator section being arranged in the other space on an opposite side of the piston;
    a pneumatically actuable locking mechanism, the spring force accumulator spring acting in the other space on a further spring force accumulator piston which is lockable with respect to the first piston by the locking mechanism, and is first releasable by a release action of the locking mechanism, the spring force accumulator piston being connected directly or via further elements to a piston rod for actuating the vehicle brake;
    wherein, after release of the locking mechanism, the spring force accumulator spring acts between the two pistons and displaces them relative to one another in the case of a parking brake operation; and
    wherein the pneumatically actuable locking mechanism is operatively configured to act only in an expansion direction of the spring force accumulator spring, and comprises one of a direction-dependent freewheel and a direction-dependent clutch.

2. The brake cylinder as claimed in claim 1, wherein the direction-dependent clutch is a directional clutch based on a positive locking action.

3. The brake cylinder as claimed in claim 2, wherein the direction-dependent clutch is a ratchet coupling.

4. The brake cylinder as claimed in claim 1, wherein the freewheel or a ratchet coupling of the direction-dependent clutch is oriented such that the locking action acts in the expansion direction of the accumulator spring.

5. The brake cylinder as claimed in claim 1, wherein the spring force accumulator piston, which is loaded by the spring force accumulator spring, is in engagement with a threaded spindle operatively connected to the clutch, wherein the spindle is secured against rotation in a release state of the brake cylinder, and wherein the threaded spindle is capable of rotation as a result of reduction or cancelation of the engagement of the clutch, whereby the spring force accumulator piston is movable in a longitudinal direction of the threaded spindle upon relieving the spring force accumulator spring.

6. The brake cylinder as claimed in claim 5, wherein the threaded spindle is not self-locking, and wherein a frictional force of the clutch is regulatable by a locking mechanism piston loadable with compressed air.

7. The brake cylinder as claimed in claim 6, wherein a ratchet coupling of the clutch is integrated into the locking mechanism piston.

8. The brake cylinder as claimed in claim 6, wherein, in an operating position, the locking mechanism piston is arranged displaceably in the first piston but in a manner wherein the locking mechanism piston cannot be rotated relative to the first piston in a circumferential direction.

9. The brake cylinder as claimed in claim 6, wherein the clutch has a disk spring, which prestresses the locking mechanism piston relative to the piston and brings about a torque transmission to the piston.

10. The brake cylinder as claimed in claim 6, wherein the locking mechanism piston is of a split configuration and has two sections engaging axially into one another via a directional saw toothing system.

11. The brake cylinder as claimed in claim 5, wherein one or more locking elements, which are spring-loaded in each case by a spring, are inserted into the locking mechanism piston, the one or more locking elements having a toothing system interacting with a toothing system of the threaded spindle.

12. The brake cylinder as claimed in claim 11, wherein a plurality of locking elements are spring-loaded radially toward the inside by the spring.

13. The brake cylinder as claimed in claim 12, wherein the locking elements engage into a corresponding toothing system on the external circumference of the threaded spindle.

14. The brake cylinder as claimed in claim 11, wherein a plurality of locking elements are spring-loaded radially toward the outside by the spring.

15. The brake cylinder as claimed in claim 14, wherein the locking elements engage into a corresponding toothing system on the internal circumference of an annular section of the threaded spindle.

16. The brake cylinder as claimed in claim 15, wherein at least one locking element is movably configured as a locking pawl, which engages by way of a plurality of teeth into a corresponding profile of the threaded spindle.

17. The brake cylinder as claimed in claim 1, wherein the clutch is designed as a system acting in the axial direction.

* * * * *